(12) United States Patent  
Zapata et al.

(10) Patent No.: US 7,857,355 B2
(45) Date of Patent: Dec. 28, 2010

(54) HIGH PRESSURE PIPE LINER COUPLING ASSEMBLY AND METHOD

(75) Inventors: Oscar Zapata, Odessa, TX (US); John Joseph Dodds, Trafford, PA (US)

(73) Assignee: Robroy Industries, Inc., Verona, PA (US)

( * ) Notice: Subject to any disclaimer, the term of this patent is extended or adjusted under 35 U.S.C. 154(b) by 382 days.

(21) Appl. No.: 11/966,443

(22) Filed: Dec. 28, 2007

(65) Prior Publication Data

US 2009/0167016 A1 Jul. 2, 2009

(51) Int. Cl.
*F16L 9/14* (2006.01)
(52) U.S. Cl. .......................... 285/55; 29/458
(58) Field of Classification Search ................ 285/55, 285/333, 334; 29/456, 458
See application file for complete search history.

(56) References Cited

U.S. PATENT DOCUMENTS

| | | | | |
|---|---|---|---|---|
| 2,284,761 A * | 6/1942 | Nathan | ...... | 285/55 |
| 3,253,841 A * | 5/1966 | Ahmad | ...... | 285/55 |
| 3,298,716 A * | 1/1967 | Taylor et al. | ...... | 285/55 |
| 3,479,059 A * | 11/1969 | Taylor et al. | ...... | 285/55 |
| 4,366,971 A * | 1/1983 | Lula | ...... | 285/55 |
| 4,400,019 A * | 8/1983 | Fruck | ...... | 285/55 |
| 4,538,837 A * | 9/1985 | Cronk | ...... | 285/55 |
| 4,647,078 A * | 3/1987 | Lundy | ...... | 285/55 |
| 5,143,407 A * | 9/1992 | Cokeh | ...... | 285/55 |
| 5,236,231 A | 8/1993 | Allen et al. | | |
| 5,282,652 A * | 2/1994 | Werner | ...... | 285/55 |
| 5,320,388 A * | 6/1994 | Lacy et al. | ...... | 285/55 |
| 5,348,211 A * | 9/1994 | White et al. | ...... | 285/55 |
| 5,505,497 A * | 4/1996 | Shea et al. | ...... | 285/55 |
| 5,988,691 A * | 11/1999 | Cruickshank | ...... | 285/55 |
| 6,036,235 A | 3/2000 | Anderson et al. | | |
| 6,042,153 A * | 3/2000 | DeLange et al. | ...... | 285/55 |
| 6,312,024 B1 | 11/2001 | Dutilleul et al. | | |
| 7,360,797 B2 | 4/2008 | Posson | | |
| 7,431,341 B2 * | 10/2008 | McIntyre | ...... | 285/55 |
| 2005/0173919 A1 | 8/2005 | Posson | | |

FOREIGN PATENT DOCUMENTS

EP        0100580 B1    5/1986

* cited by examiner

*Primary Examiner*—David E Bochna
(74) *Attorney, Agent, or Firm*—The Webb Law Firm

(57) ABSTRACT

A liner assembly including a first ring member, a second ring member, a corrosion barrier ring, a first liner and a second liner. The first ring member has a body member with a first end and a second end. The first end has a first flange and a second flange extending therefrom. The first flange and the second flange define a space therebetween. The second ring member has an extended body member having a first end and a second end. The second end has a first flange and a second flange extending therefrom. The first flange and the second flange define a space therebetween. The corrosion barrier ring is disposed between and cooperates with the first end of the first ring member and the second end of the second ring member. The first liner is configured to be secured in the space formed between the first flange and the second flange of the first ring member. The second liner is configured to be secured in the space formed between the first flange and the second flange of the second ring member.

25 Claims, 6 Drawing Sheets

US 7,857,355 B2

HIGH PRESSURE PIPE LINER COUPLING ASSEMBLY AND METHOD

BACKGROUND OF THE INVENTION

1. Field of the Invention

The present invention relates to a coupling system utilized in connecting end-to-end lined pipe used in oil wells and the like, and, more particularly, a liner assembly for use in a joint between two pipe segments and a method of connecting two unmodified pipe segments with a linear system which will prevent corrosion.

2. Description of Related Art

Many downhole oil-production operations are carried out in highly corrosive environments resulting from production and/or re-injection of hydrocarbons and formation of brinewaters containing salts and gases, such as hydrogen sulfide and carbon dioxide which can pass through the pipe interior.

To provide a useful life to the lengths of steel pipes that are used in such environments, corrosive resistant liners are installed within each pipe length before it is installed into the downhole string. Appropriate threaded coupling assemblies are required to connect the pipe in an end-to-end relationship. Coupling assemblies are also required to connect the internal liners that provide protection for the pipe and pipe threaded connection area against internal corrosion.

There are a large number of pipe end constructions and thread constructions employed by various pipe manufacturers to assure against fluid and gas leakage. Due to the presence of unique metal-to-metal torque shoulders and metal-to-metal seal areas, many of these pipe end and thread constructions known in the art require a custom built liner or coupling assembly unique to the pipe end and potentially even a custom pipe end thread design to accommodate an internal lining system.

One method known in the art utilizes an internal lining system that requires the insertion of a rigid plastic tube inside steel tubing and filling the annular space between the plastic tube and steel tubing with mortar. The inner rigid plastic tube, or liner, is capped or terminated at the end of the pipe with a flange, known as a "flare". The flare ends provide a surface area for compression of a barrier ring, such as an elastomeric barrier ring, in the coupling assembly.

An obstacle with insertion of such an assembly is that the threaded pipes or couplings need to be machined and threaded with special provisions to accommodate the lining process. This proves to be ineffective in time and cost as well as productivity.

Additionally, it has been discovered that when such liner systems are used in high temperature and pressure environments, the movement of the fluid through the pipes causes the liner to move or shift slightly within the pipes. This movement of the liner causes exposure of the grout or mortar positioned behind the liner. Such exposure erodes the grout or mortar and eventually corrodes the pipe.

In view of the foregoing, there is a need for a standardized or universal internal liner coupling assembly that can accommodate the wide variety of pipe end constructions currently in use without the need for special modifications to proprietary pipe end threads and couplings. There is also a need for a liner coupling assembly that can accommodate the liner, particularly at high pressures, thereby preventing grout or mortar exposure while at the same time preventing liner movement.

SUMMARY OF THE INVENTION

Accordingly, the present invention has been developed to provide a liner coupling assembly that secures a liner within a pipe at high pressure. Additionally, the liner coupling assembly of the present invention can accommodate the wide variety of pipe end constructions currently in use without the need for any special modifications.

More specifically, the present invention is directed to a liner assembly for use in a joint between two pipe segments. The liner assembly includes a first ring member, a second ring member, a corrosion barrier ring, a first liner and a second liner. The first ring member has a body member with a first end and a second end. The first end has a first flange and a second flange extending therefrom. The first flange and the second flange define a space therebetween. The second ring member has an extended body member having a first end and a second end. The second end has a first flange and a second flange extending therefrom. The first flange and the second flange define a space therebetween. The corrosion barrier ring is disposed between and cooperates with the first end of the first ring member and the second end of the second ring member. The first liner is configured to be secured in the space formed between the first flange and the second flange of the first ring member. The second liner is configured to be secured in the space formed between the first flange and the second flange of the second ring member.

The first flange of the first ring member may be positioned adjacent and secured to a first pipe segment. Additionally, the first flange of the first ring member may extend a greater distance from the first end of the body member of the first ring member than the second flange of the first ring member. The first flange of the second ring member may be positioned adjacent and secured to a second pipe segment, and the first flange of the second ring member may extend a greater distance from the second end of the extended body member of the second ring member than the second flange of the second ring member.

The corrosion barrier ring may include opposing indented ends comprised of beveled portions and the second end of the first ring member and the first end of the second ring member may include registering beveled portions to cooperate with the opposing indented ends of the corrosion barrier ring. The beveled portions of the corrosion barrier ring, the second end of the first ring member and the first end of the second ring member may be beveled at a 45° angle. The second end of the first ring member and the first end of the second ring member may be bonded adhesively to the opposing ends of the corrosion barrier ring.

The first and second ring members may be made of glass reinforced epoxy. The corrosion barrier ring may be made of a resilient elastomeric material or any other suitable compressible material. A bottom portion of the second flange of the first ring member may taper away from the first end of the body member of the first ring member, and a bottom portion of the second flange of the second ring member may taper away from the second end of the extended body member of the second ring member.

The present invention is also directed to a coupling assembly. The coupling assembly includes a first pipe, a second pipe, a coupling member fixedly connecting the first pipe and the second pipe, a first ring member positioned at a first end of the first pipe, a second ring, a corrosion barrier ring, a first liner and a second liner. The first ring member includes a body member having a first end and a second end. The first end has a first flange and a second flange extending therefrom. The first flange and the second flange define a space therebetween. The second ring includes an extended body member positioned adjacent to the coupling member and has a first end and a second end. The second end has a first flange and a second flange extending therefrom into the second pipe. The first flange and the second flange define a space therebetween. The corrosion barrier ring is disposed between and cooperates with the first end of the first ring member and the second end of the second ring member. The first liner is disposed in the first pipe and has an end configured to be secured in the space formed between the first flange and the second flange of the first ring member. The second liner is disposed in the second pipe and has an end configured to be secured in the space formed between the first flange and the second flange of the second ring member.

The first flange of the first ring member may be secured to the first pipe with grout. The first flange of the first ring member may extend a greater distance from the first end of the body member of the first ring member than the second flange of the first ring member. The first flange of the second ring member may be secured to the second pipe with grout. The first flange of the second ring member may extend a greater distance from the second end of the extended body member of the second ring member than the second flange of the second ring member. A bottom portion of the second flange of the first ring member may taper away from the first end of the body member of the first ring member. A bottom portion of the second flange of the second ring member may taper away from the second end of the extended body member of the second ring member.

Additionally, the present invention is a method of connecting two pipe segments. The method includes the steps of providing a first pipe segment; providing a second pipe segment; inserting a first liner into the first pipe segment; inserting a second liner into the second pipe segment; and providing a first ring member comprising a body member having a first end and a second end. The first end has a first flange and a second flange extending therefrom. The first flange and the second flange define a space therebetween. Thereafter, the first ring member is placed in engagement with the first liner by securing an end of the first liner in the space formed between the first flange and the second flange of the first ring member. Next, a second ring member comprising an extended body member having a first end and a second end is provided. The second end has a first flange and a second flange extending therefrom. The first flange and the second flange define a space therebetween. Then, the second ring member is placed in engagement with the second liner by securing an end of the second liner in the space formed between the first flange and the second flange of the second ring member. A corrosion barrier ring is interposed between the second end of the first ring member and the first end of the second ring member and a coupling member adapted to receive a second end of the first pipe segment and a first end of the second pipe segment therein is provided. Finally, a second end of the first pipe segment having the first liner disposed therein is received into the coupling member to fixedly join the first pipe segment with the coupling member, and a first end of the second pipe segment having the second liner disposed therein is received into the coupling member to fixedly join the second pipe segment with the coupling member.

Another embodiment of the present invention is directed to a liner assembly for use in a joint between two pipe segments. The liner assembly includes a two-part ring member comprising an outer sleeve having a generally cylindrical shape with a first end and a second end; and an inner sleeve configured to be positioned within the outer sleeve. The inner sleeve includes a body member having a first end and a second end. The first end has a flange extending therefrom. The outer sleeve and the flange define an annular gap therebetween when the inner sleeve is positioned within the outer sleeve. The liner assembly also includes a second ring member comprising an extended body member having a first end and a second end. The second end has a first flange and a second flange extending therefrom. The first flange and the second flange define a space therebetween. The liner assembly also includes a corrosion barrier ring disposed between and cooperating with the first end of the inner sleeve of the two-part ring member and the second end of the second ring member, a first liner configured to be secured in the annular gap formed between the flange of the inner sleeve and outer sleeve and a second liner configured to be secured in the space formed between the first flange and the second flange of the second ring member.

The outer sleeve may be configured to have a first end that extends a greater distance from the first end of the body member of the inner sleeve than the flange of the inner sleeve. The first flange of the second ring member may be positioned adjacent and secured to a second pipe segment. The first flange of the second ring member may be configured to extend a greater distance from the second end of the extended body member of the second ring member than the second flange of the second ring member. The corrosion barrier ring may include opposing indented ends comprised of beveled portions and the second end of the body member of the inner sleeve and the first end of the second ring member comprise registering beveled portions to cooperate with the opposing indented ends of the corrosion barrier ring.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENT INVENTION

Figure 1:
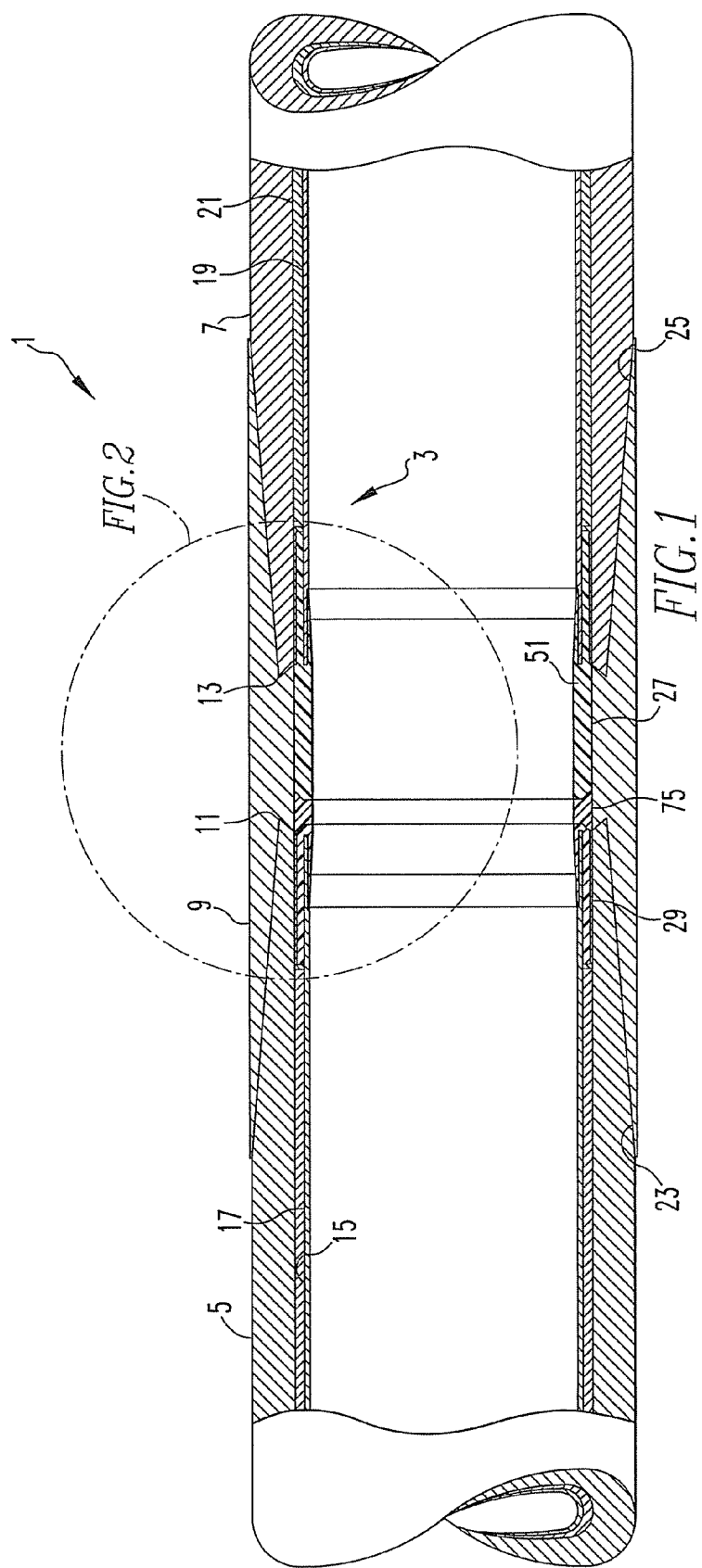
FIG. 1 is a cross-sectional view of a high pressure pipe liner coupling assembly in accordance with a first embodiment of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention.

A conventional process of connecting pipes in the oil and gas industry utilizes steel threaded couplings, which are machined and threaded and adapted to accommodate an insert liner. The present invention relates generally to a coupling assembly, denoted generally as reference numeral 1, used to connect adjacent or opposing pipe segments, and a liner assembly 3 for use in coupling assembly 1. Coupling assembly 1 is adapted to connect internal liners of the liner assembly 3 as described in detail hereinafter.

Figure 2:
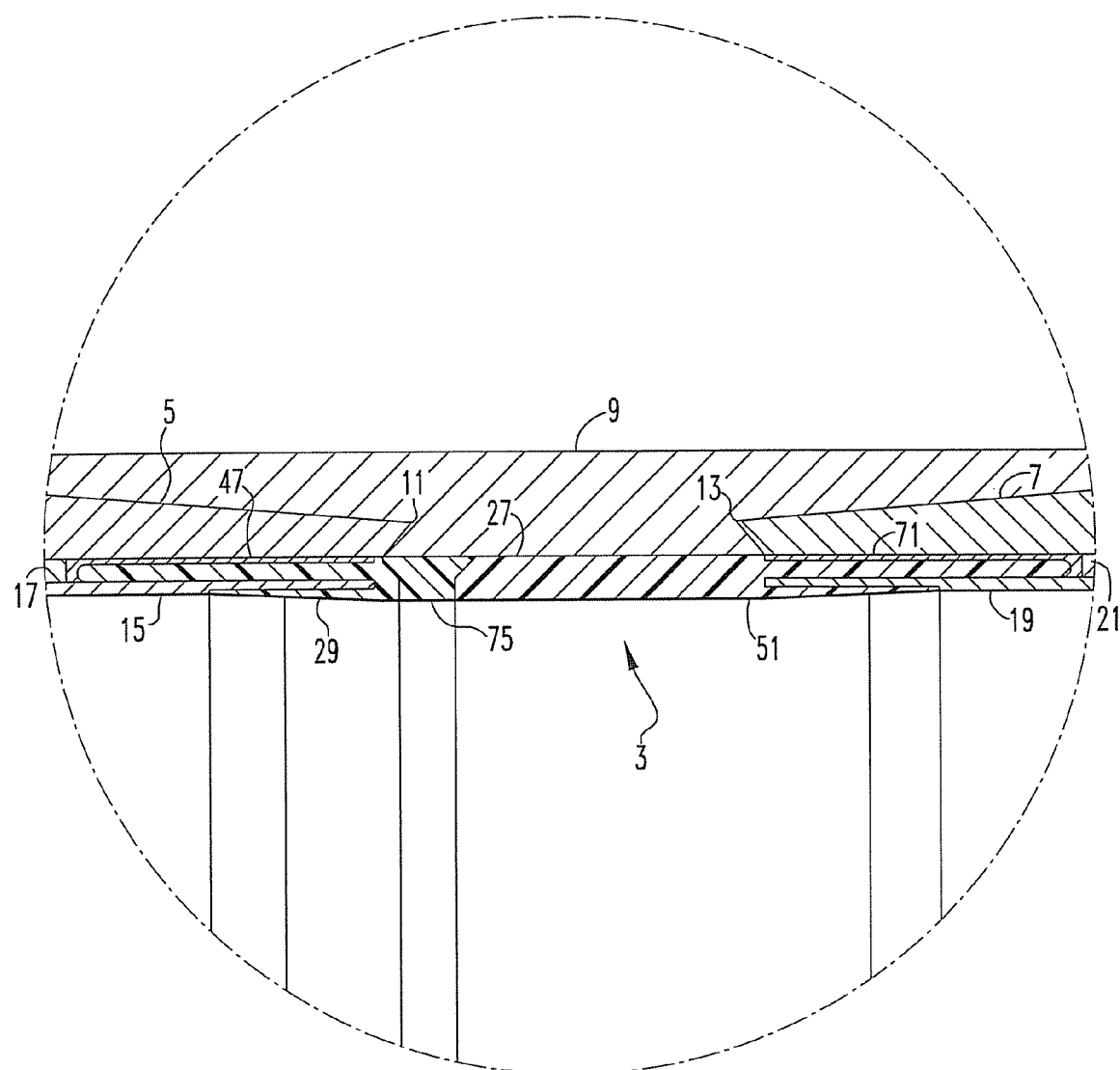
FIG. 2 is a portion of the cross-sectional view of FIG. 1 enlarged for magnification purposes.

With reference to FIGS. 1 and 2, coupling assembly 1 includes a first pipe segment 5, a second pipe segment 7, a coupling member 9 interconnecting first and second pipe segments 5, 7 and liner assembly 3 generally disposed within an area defined by coupling member 9. First pipe segment 5 has a second end 11 that is configured to be inserted into coupling member 9, and second pipe segment 7 has a first end 13 that is configured to be inserted into coupling member 9.

Liner assembly 3 includes a first liner 15 disposed in first pipe segment 5. First liner 15 is placed in the first pipe segment 5 and defines a first annular gap 17 with the inside surface of first pipe segment 5. First annular gap 17 is typically filled with mortar or grout as is known in the art. For oil and gas applications, the mortar or grout may be a mixture of oil well cements and oil well cement additives mixed with water to a controlled slurry viscosity. Liner assembly 3 further includes a second liner 19 disposed in the second pipe segment 7 that defines a second annular gap 21 with the inside surface of second pipe segment 7. Second annular gap 21 is also typically filled with mortar or grout as described above. First liner 15 and second liner 19 may be made of materials such as filament wound fiber reinforced thermosetting resin or extruded thermoplastic, and the like.

Second end 11 of first pipe segment 5 and first end 13 of second pipe segment 7 are connected together by coupling member 9 as described hereinabove. Coupling member 9 may be a steel threaded coupling having internal threads (not shown) provided in both ends thereof. In particular, the internal threads (not shown) may be provided at a first end 23 and a second end 25 of coupling member 9 and a central, unthreaded portion 27 is located between first end 23 and second end 25. The internal threads (not shown) located at first end 23 of coupling member 9 receive external threads (not shown) provided at second end 11 of first pipe segment 5 and internal threads (not shown) located at second end 25 of coupling member 9 receive external threads (not shown) of first end 13 of second pipe segment 7. Coupling member 9 may vary in shape and size for various applications. For example, first and second ends 23, 25 of coupling member 9 may be tapered to further ensure a tighter seal between first and second pipe segments 5, 7 and coupling member 9.

Figure 3:
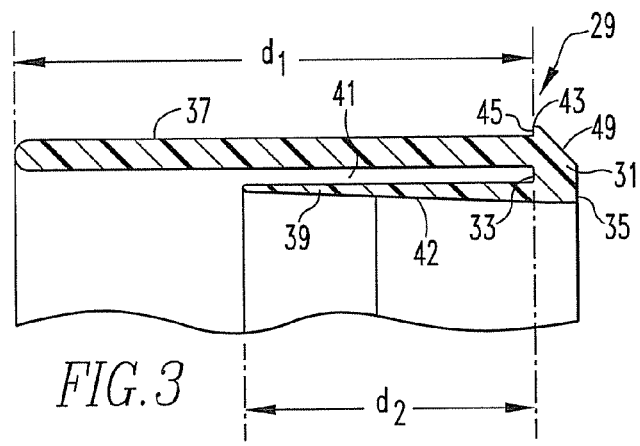
FIG. 3 is a partial cross-sectional view of a first ring member used in the coupling assembly of FIG. 1.

With reference to FIG. 3 and with continuing reference to FIGS. 1 and 2, liner assembly 3 includes a first ring member 29 configured to securely engage first liner 15 at second end 11 of first pipe segment 5. First ring member 29 includes a body member 31 with a first end 33 and a second end 35. First end 33 has a first flange 37 and a second flange 39 extending therefrom. First flange 37 and second flange 39 define a space 41 therebetween. First flange 37 extends a distance $d_1$ from first end 33 of body member 31, and second flange 39 extends a distance $d_2$ from first end 33 of body member 31. Additionally, first flange 37 extends a greater distance $d_1$ from first end 33 of body member 31 of first ring member 29 than second flange 39 of first ring member 29. A bottom portion 42 of second flange 39 of first ring member 29 is formed to taper away from first end 33 of body member 31. First liner 15 is configured to be secured in space 41 formed between first flange 37 and second flange 39 of first ring member 29.

Furthermore, first flange 37 extends from first end 33 of body member 31 at a position slightly below a top portion 43 of body member 31 thereby creating a step 45. First flange 37 of first ring member 29 is positioned adjacent to first pipe segment 5. When properly positioned, step 45 of first ring member 29 creates a void 47 between first flange 37 and first pipe segment 5. Void 47 may be filled with grout to secure first ring member 29 to first pipe segment 5. Additionally, second end 35 of body member 31 of first ring member 29 defines a shoulder and includes a beveled portion 49.

First ring member 50 may be made of molded fiber reinforced resin and the like. First ring member 29 may also be adhered or bonded to first liner 15 with an adhesive or first liner 15 may be friction fit within space 41 formed between first flange 37 and second flange 39 of first ring member 29.

Figure 4:
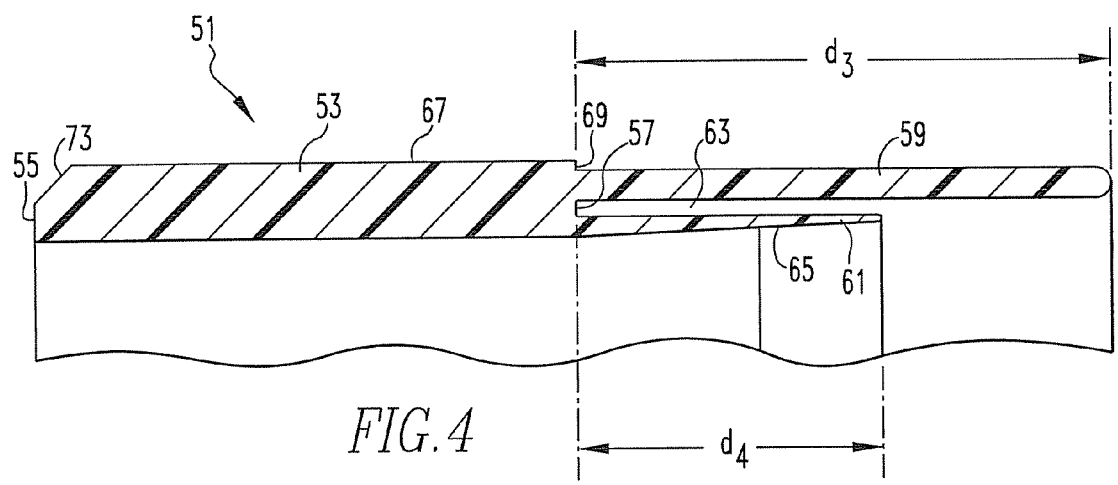
FIG. 4 is a partial cross-sectional view of a second ring member used in the coupling assembly of FIG. 1.

With FIG. 4 and with continuing reference to FIGS. 1 and 2, liner assembly 3 also includes a second ring member 51 configured to securely engage second liner 19 at first end 13 of second pipe segment 7. Second ring member 51 has an extended body member 53 having a first end 55 and a second end 57. Second end 57 has a first flange 59 and a second flange 61 extending therefrom. First flange 59 and second flange 61 define a space 63 therebetween. First flange 59 extends a distance $d_3$ from second end 57 of extended body member 53, and second flange 61 extends a distance $d_4$ from second end 57 of extended body member 53. Additionally, first flange 59 extends a greater distance $d_3$ from second end 57 of extended body member 53 of second ring member 51 than second flange 61 of second ring member 51. A bottom portion 65 of second flange 61 of second ring member 51 is formed to taper away from second end 57 of extended body member 53. Second liner 19 is configured to be secured in space 63 formed between first flange 59 and second flange 61 of second ring member 51.

Furthermore, first flange 59 extends from second end 57 of extended body member 53 at a position slightly below a top portion 67 of extended body member 53 thereby creating a step 69. First flange 59 of second ring member 51 is positioned adjacent to second pipe segment 7. When properly positioned, step 69 of second ring member 51 creates a void 71 between first flange 59 and second pipe segment 7. Void 71 may be filled with grout to secure second ring member 51 to second pipe segment 7. Additionally, first end 55 of extended body member 53 of second ring member 51 defines a shoulder and includes a beveled portion 73.

Extended body member 53 of second ring member 51 has a longer axial length than body member 31 of first ring member 29 and is generally shaped to fit within (i.e., cooperate with) unthreaded portion 27 of coupling member 9. Extended body member 53 of second ring member 51 may be adjusted (i.e., sized) to accommodate different length coupling members 9. Extended body member 53 ensures internal protection of unthreaded portion 27 of coupling member 9 and protects coupling member 9 from corrosion.

Second ring member 51 may be made of molded fiber reinforced resin and the like. Second ring member 51 may also be adhered or bonded to second liner 19 with an adhesive or second liner 19 may be friction fit within space 63 formed between first flange 59 and second flange 61 of second ring member 51.

By securing first liner 15 between first flange 37 and second flange 39 of first ring member 29 and second liner 19 between first flange 59 and second flange 61 of second ring member 51, liners 15, 19 are prevented from shifting when a high pressure or temperature fluid flows through first and second pipe segments 5, 7 thereby preventing corrosion of the mortar or grout positioned between liners 15, 19 and pipe segments 5, 7.

Figure 5:
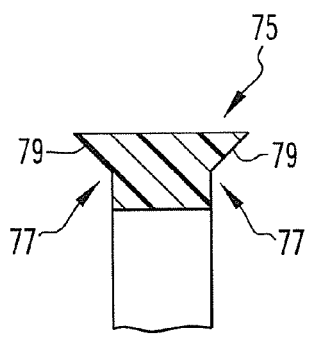
FIG. 5 is a partial cross-sectional view of a corrosion barrier ring used in the coupling assembly of FIG. 1.

With reference to FIG. 5 and with continuing reference to FIGS. 1 and 2, liner assembly 3 also includes a corrosion barrier ring 75 disposed between first and second ring members 29, 51. Corrosion barrier ring 75 may be made of glass reinforced PTFE (Teflon) and the like. Corrosion barrier ring 75 defines opposing indented ends 77. Opposing indented ends 77 include beveled portions 79.

Opposing indented ends 77 of corrosion barrier ring 75 cooperate with first ring member 29 and second ring member 51. More particularly, opposing indented ends 77 cooperate with second end 35 of body member 31 of first ring member 29 and first end 55 of extended body member 53 of second ring member 51. Beveled portion 49 of second end 35 of body member 31 of first ring member 31 and beveled portion 73 of first end 55 of extended body member 53 of second ring member 51 are adapted to register with beveled portions 79 of corrosion barrier ring 75. The cooperation between opposing indented ends 77 with second end 35 of body member 31 of first ring member 29 on one side and first end 55 of extended body member 53 of second ring member 51 on the opposite side ensures integrity of the sealing fit of liner assembly 3.

Beveled portions 79 of corrosion barrier ring 75 may be beveled at 45° angles. Additionally, beveled portion 49 at second end 35 of body member 31 of first ring member 29 and beveled portion 73 at first end 55 of extended body member 53 of second ring member 51 may also be beveled at 45° angles. When placed adjacent to one end of corrosion barrier ring 75, the 45° angle of beveled portion 49 at second end 35 of body member 31 of first ring member 29 complements the 45° angle of beveled portion 79 of corrosion barrier ring 75 to seal and join corrosion barrier ring 75 and first ring member 29 together. Similarly, when placed adjacent the opposite end of corrosion barrier ring 75, the 45° angle defined by beveled portion 73 at first end 55 of extended body member 53 of second ring member 51 complements the 45° angle of beveled portion 79 of corrosion barrier ring 75 to seal and join corrosion barrier ring 75 and second ring member 61 together. Additionally, second end 35 of body member 31 of first ring member 29 and first end 55 of extended body member 53 of second ring member 51 may be bonded adhesively to opposing ends 77 of corrosion barrier ring 75.

While beveled portions 79 of corrosion barrier ring 75 have been discussed herein as having a 45° angle, this is not to be construed as limiting the present invention as beveled portions 79 of corrosion barrier ring 75 may be of any shape or size, so long as first ring member 29 and second ring member 51 have registering (i.e., corresponding) beveled portions 49, 73, respectively.

The present invention is also directed to a method of connecting two pipe segments. Initially, first pipe or pipe segment 5 and second pipe or pipe segment 7 are provided. First liner 15 is inserted into first pipe 5 and second liner 19 is inserted into second pipe 7. First ring member 29 is placed in engagement with first liner 15 by securing first liner 15 in space 41 formed between first flange 37 and second flange 39 of first ring member 29 as discussed hereinabove. Second ring member 60 is placed in engagement with second liner 19 by securing second liner 19 in space 63 formed between first flange 59 and second flange 61 of second ring member 51 as discussed hereinabove. Thereafter, corrosion barrier ring 75 is interposed between second end 35 of body member 31 of first ring member 29 and first end 55 of extended body member 53 of second ring member 51 in the manner discussed previously. Opposing indented ends 77 of corrosion barrier ring 75 cooperate with second end 35 of body member 31 of first ring member 29 and first end 55 of extended body member 53 of second ring member 51, respectively. Second end 35 of body member 31 of first ring member 29 and first end 55 of extended body member 53 of second ring member 51 define corresponding registering shapes to cooperate with opposing indented ends 77 of corrosion barrier ring 75.

The method also includes the step of fixedly joining first and second pipe segments 5, 7 with external coupling member 9 extending between first and second pipe segments 5, 7, respectively. Coupling member 9 is adapted to receive ends 11, 13 of the first and second pipe segments 5, 7. First pipe segment 5 is received into coupling member 9 by engaging the external threads (not shown) of first pipe segment 5 with the internal threads (not shown) of coupling member 9. First pipe segment 5 has first liner 15 disposed therein with first ring member 29 secured to first liner 15.

Typically, coupling member 9 is engaged with second end 11 of first pipe segment 5 including first liner 15 and first ring member 29 prior to installation, for example, in an oil or gas well. Corrosion barrier ring 75 is then installed in coupling member 9 such that beveled portion 79 engages with beveled portion 49 at second end 35 of body member 31 of first ring member 29. Once corrosion barrier ring 75 is installed in coupling member 9, second pipe segment 7 is threaded or otherwise positioned into coupling member 9 such that beveled portion 77 on the opposing end of corrosion barrier ring 75 engages with beveled portion 73 of first end 55 of second ring member 51.

Corrosion barrier ring 75 is then compressed between second end 35 of body member 31 of first ring member 29 and first end 55 of extended body member 53 of second ring member 51 as second pipe segment 7 is rotated into engagement with coupling member 9, which fixedly joins first and second pipe segments 5, 7 together. Unthreaded portion 27 of coupling member 9 functions to absorb the concentrated stresses so as to allow corrosion barrier ring 75 to be compressed between first ring member 29 and second ring member 51.

Compressed corrosion barrier ring 75 acts to prevent fluids passing through the joined pipe segments 5, 7 from causing coupling member 9 to fail due to internal corrosion. Liners 15, 19 function to energize or compress corrosion barrier ring 75 inside the connection between first and second pipe segments 5, 7 to provide continuous corrosion protection not only inside lined pipes or casing joints generally, but also through coupling member 19. Corrosion barrier ring 75 undergoes further compression between second end 35 of body member 31 of first ring member 29 and first end 55 of extended body member 53 of second ring member 51 as new pipe is added to the pipe string.

Figure 6:
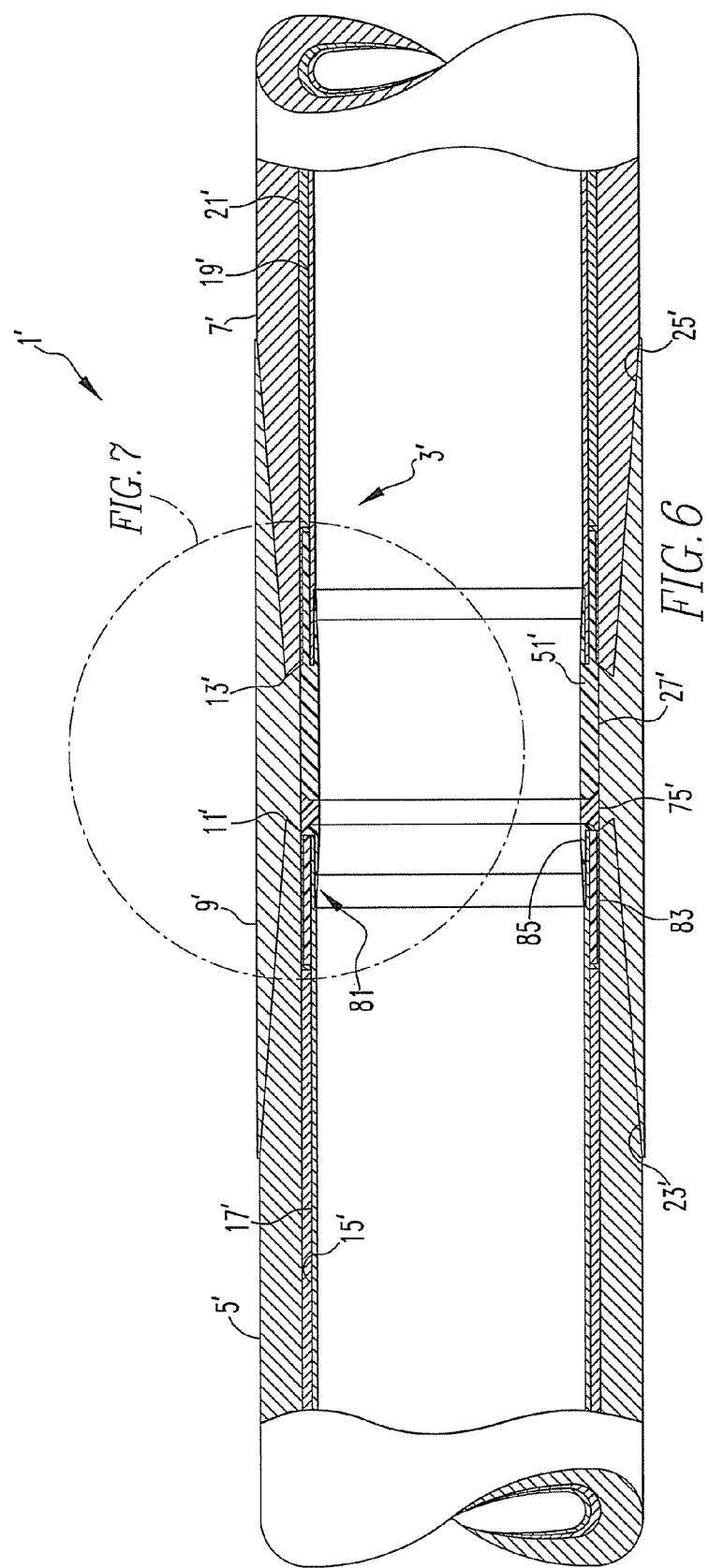
FIG. 6 is a cross-sectional view of a high pressure pipe liner coupling assembly in accordance with an alternative embodiment of the present invention.
Figure 7:
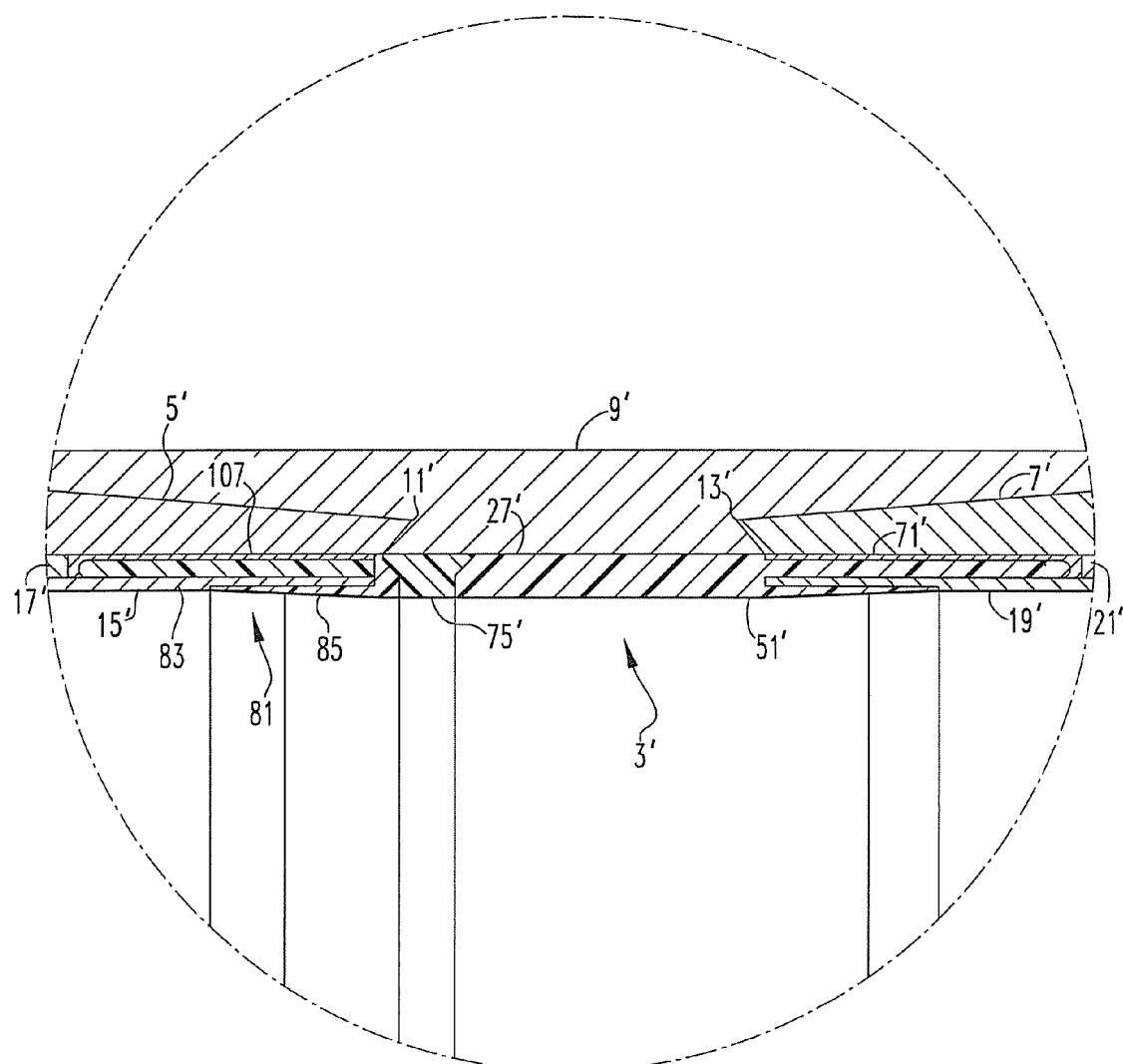
FIG. 7 is a portion of the cross-sectional view of FIG. 6 enlarged for magnification purposes.

With reference to FIGS. 6 and 7, another embodiment of the coupling assembly replaces first ring member 29 with a two-part ring member as will be discussed hereinafter. Coupling assembly 1' in accordance with another embodiment of the present invention includes a first pipe segment 5', a second pipe segment 7', a coupling member 9' interconnecting first and second pipe segments 5', 7' and liner assembly 3' generally disposed within an area defined by coupling member 9'. First pipe segment 5' has a second end 11' that is configured to be inserted into coupling member 9', and second pipe segment 7' has a first end 13' that is configured to be inserted into coupling member 9'.

Liner assembly 3' includes a first liner 15' disposed in first pipe segment 5'. First liner 15' is placed in the first pipe segment 5' and defines a first annular gap 17' with the inside surface of first pipe segment 5'. First annular gap 17' is typically filled with mortar or grout as is known in the art. For oil and gas applications, the mortar or grout may be a mixture of oil well cements and oil well cement additives mixed with water to a controlled slurry viscosity. Liner assembly 3' further includes a second liner 19' disposed in the second pipe segment 7' that defines a second annular gap 21' with the inside surface of second pipe segment 7'. Second annular gap 21' is also typically filled with mortar or grout as described above. First liner 15' and second liner 19' may be made of materials such as filament wound fiber reinforced thermosetting resin or extruded thermoplastic, and the like.

Second end 11' of first pipe segment 5' and first end 13' of second pipe segment 7' are connected together by coupling member 9' as described hereinabove. Coupling member 9' may be a steel threaded coupling having internal threads (not shown) provided in both ends thereof. In particular, the internal threads (not shown) may be provided at a first end 23' and a second end 25' of coupling member 9' and a central, unthreaded portion 27' is located between first end 23' and second end 25'. The internal threads (not shown) located at first end 23' of coupling member 9' receive external threads (not shown) provided at second end 11' of first pipe segment 5' and internal threads (not shown) located at second end 25' of coupling member 9' receive external threads (not shown) of first end 13' of second pipe segment 7'. Coupling member 9' may vary in shape and size for various applications. For example, first and second ends 23', 25' of coupling member 9' may be tapered to further ensure a tighter seal between first and second pipe segments 5', 7' and coupling member 9'.

Figure 8:
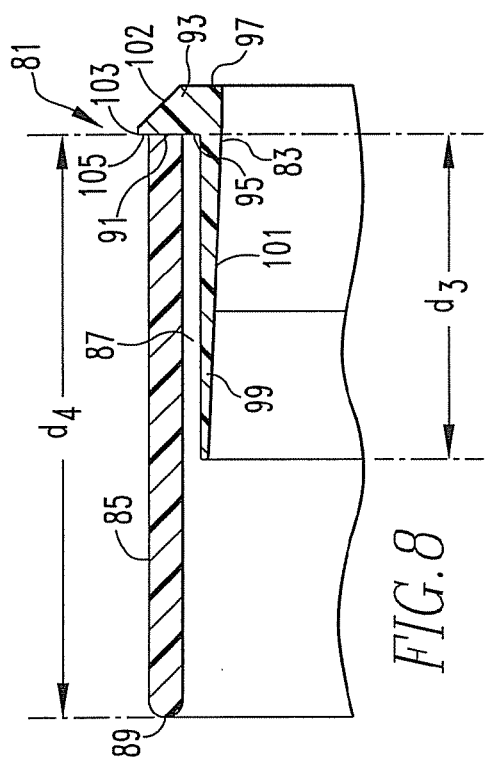
FIG. 8 is a partial cross-sectional view of a two-part ring member used in the coupling assembly of FIG. 6.
Figure 9:
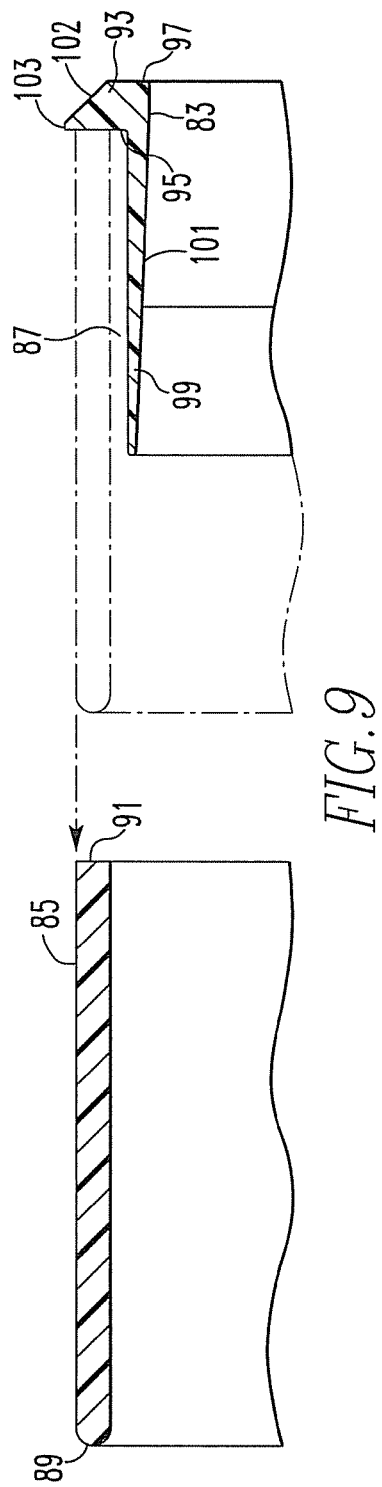
FIG. 9 is an exploded, partial cross-sectional view of the two-part ring member of FIG. 8.

With reference to FIGS. 8 and 9, and with continuing reference to FIGS. 1 and 2, liner assembly 3' includes a two-part ring member 81 configured to securely engage first liner 15' at second end 11' of first pipe segment 5'. Two-part ring member 81 includes an outer sleeve 83 and an inner sleeve 85. Both outer sleeve 83 and inner sleeve 85 have a generally cylindrical shape with outer sleeve 83 having a larger diameter than inner sleeve 85. As will be discussed hereinafter in greater detail, outer sleeve 83 is positioned at second end 11' of first pipe segment 5'. Then, inner sleeve 85 is positioned within outer sleeve 83 thereby creating an annular gap 87 therebetween. Annular gap 87 is configured to accommodate first liner 15' therein.

Outer sleeve 83 has a generally cylindrical shape as mentioned above that has a first end 89 and a second end 91. First end 89 of outer sleeve 83 is configured to be received within second end 11' of first pipe segment 5', and second end 91 of outer sleeve 83 is adapted to receive inner sleeve 85 therein.

Inner sleeve 85 includes a body member 93 with a first end 95 and a second end 97. First end 95 has a flange 99 extending therefrom. Flange 99 extends a distance $d_3$ from first end 95 of body member 93. A bottom portion 101 of flange 99 of inner sleeve 85 is formed to taper away from first end 33 of body member 31. Second end 97 of body member 93 of inner sleeve 85 defines a shoulder and includes a beveled portion 102.

When inner sleeve 85 is positioned within outer sleeve 83, second end 91 of outer sleeve 83 abuts first end 95 of body member 93 at a position slightly below a top portion 103 of body member 93 thereby creating a step 105. Additionally, outer sleeve 83 extends a distance $d_4$ from first end 95 of body member 93. Outer sleeve 83 extends a greater distance $d_4$ from first end 95 of body member 93 of inner sleeve 85 than flange 99 of inner sleeve 85.

As discussed above, first end 89 of outer sleeve 83 is configured to be received within second end 11' of first pipe segment 5' thereby positioning an outer diameter of outer sleeve 83 adjacent to first pipe segment 5. When properly positioned, step 105 of creates a void 107 between outer sleeve 83 and first pipe segment 5'. Void 107 may be filled with mortar to secure outer sleeve 83 to first pipe segment 5'.

Outer sleeve 83 and inner sleeve 85 may be made of molded fiber reinforced resin and the like. Outer sleeve 83 and inner sleeve 85 may also be adhered or bonded to first liner 15' with an adhesive or first liner 15' may be friction fit within annular gap 87 formed between outer sleeve 83 and flange 99 of inner sleeve 85.

Liner assembly 3' also includes a second ring member 51' configured to securely engage second liner 19' at first end 13' of second pipe segment 7'. Second ring member 51' is identical to second ring member 51' discussed hereinabove with regard to the first embodiment of the present invention. A corrosion barrier ring 75' disposed between inner sleeve 85 and second ring member 51' is also provided. Corrosion barrier ring 75' is identical to corrosion barrier ring 75 discussed hereinabove with regard to the first embodiment of the present invention.

Liner assembly 3' in accordance with the second embodiment of the present invention is installed within a pipeline as follows. First, second ring member 51' is submersed in acetone to ensure that it is adequately cleaned. In addition, the inner diameter of second liner 19' is cleaned with acetone. Next, after the acetone has total evaporated, an adhesive is applied to the space between the first flange and the second flange of the second ring member 51'. Thereafter, second liner 19' is positioned within the space between the first flange and the second flange of second ring member 51' using a clockwise rotational motion. All excessive adhesive is then cleaned away from the second liner 19' and the second ring member 51' and the adhesive is allowed to cure for at least 60 minutes.

Next, a setting plug (not shown) is installed in a first end of second ring member 51'. The liner is then inserted into first end 23' of coupling member 9' and then into second pipe segment 7', which has been secured to coupling member 9', such that the second ring member is properly positioned within coupling member 9' as shown in FIG. 7. Then, a pumping cap is positioned at a second end of second pipe segment 7' over second liner 19'. Mortar is then pumped through the pumping cap to fill second annular gap 21'. The mortar is then allowed to set for about 2 to 3 hours before the pumping cap is removed.

Thereafter, first liner 15' is positioned within first pipe segment 5' and mortar is pumped into first annular gap 17' using the pumping cap. Outer sleeve 83 of two-part ring member 81 is positioned over the outer diameter of first liner 15', and then positioned within second end 11' of first pipe segment 5' using a sleeve tool (not shown). Once the mortar has cured for a minimum of about 8 hours, second end 11' of first pipe segment 5' with outer sleeve 83 positioned therein is prepared for installation of inner sleeve 85. After the finishing process is complete, the inner diameter of first liner 15' and inner sleeve 85 are cleaned with acetone. An adhesive is then applied to the outer diameter of inner sleeve 85 and inner sleeve 85 is positioned within second end 11' of first pipe segment 5'. All excess adhesive is removed from first liner 15' and inner sleeve 85, and the adhesive is allowed to cure. Once the adhesive has cured, second end 11' of first pipe segment 5' is positioned within first end 23' of coupling member 9'.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A liner assembly for use in a joint between two pipe segments, comprising:
   a first ring member comprising a body member having a first end and a second end, the first end having a first flange and a second flange extending therefrom, the first flange and the second flange defining a space therebetween;
   a second ring member comprising an extended body member having a first end and a second end, the second end having a first flange and a second flange extending therefrom, the first flange and the second flange defining a space therebetween, and the extended body member being axially longer than the body member of the first ring member;
   a corrosion barrier ring disposed between and cooperating with the first end of the first ring member and the second end of the second ring member;
   a first liner configured to be secured in the space formed between the first flange and the second flange of the first ring member; and
   a second liner configured to be secured in the space formed between the first flange and the second flange of the second ring member.

2. The liner assembly of claim 1, wherein the first flange of the first ring member is positioned adjacent and secured to a first pipe segment.

3. The liner assembly of claim 1, wherein the first flange of the first ring member extends a greater distance from the first end of the body member of the first ring member than the second flange of the first ring member.

4. The liner assembly of claim 1, wherein the first flange of the second ring member is positioned adjacent and secured to a second pipe segment.

5. The liner assembly of claim 1, wherein the first flange of the second ring member extends a greater distance from the second end of the extended body member of the second ring member than the second flange of the second ring member.

6. The liner assembly of claim 1, wherein the corrosion barrier ring includes opposing indented ends comprised of beveled portions and the second end of the first ring member and the first end of the second ring member comprise registering beveled portions to cooperate with the opposing indented ends of the corrosion barrier ring.

7. The liner assembly of claim 6, wherein the beveled portions of the corrosion barrier ring, the second end of the first ring member and the first end of the second ring member are beveled at a 45° angle.

8. The liner assembly of claim 6, wherein the second end of the first ring member and the first end of the second ring member are bonded adhesively to the opposing ends of the corrosion barrier ring.

9. The liner assembly of claim 1, wherein the first and second ring members are made of glass reinforced epoxy.

10. The liner assembly of claim 1, wherein the corrosion barrier ring is made of a resilient elastomeric material.

11. The liner assembly of claim 1, wherein a bottom portion of the second flange of the first ring member tapers away from the first end of the body member of the first ring member.

12. The liner assembly of claim 1, wherein a bottom portion of the second flange of the second ring member tapers away from the second end of the extended body member of the second ring member.

13. A coupling assembly comprising:
   a first pipe;
   a second pipe;
   a coupling member fixedly connecting the first pipe and the second pipe;
   a first ring member positioned at a first end of the first pipe, the first ring member comprising a body member having a first end and a second end, the first end having a first flange and a second flange extending therefrom, the first flange and the second flange defining a space therebetween;
   a second ring member comprising an extended body member positioned adjacent to the coupling member and having a first end and a second end, the second end having a first flange and a second flange extending therefrom into the second pipe, the first flange and the second flange defining a space therebetween, and the extended body member being axially longer than the body member of the first ring member;
   a corrosion barrier ring disposed between and cooperating with the first end of the first ring member and the second end of the second ring member;
   a first liner disposed in the first pipe, the first liner having an end configured to be secured in the space formed between the first flange and the second flange of the first ring member; and
   a second liner disposed in the second pipe, the second liner having an end configured to be secured in the space formed between the first flange and the second flange of the second ring member.

14. The coupling assembly of claim 13, wherein the first flange of the first ring members is secured to the first pipe with grout.

15. The coupling assembly of claim 13, wherein the first flange of the first ring member extends a greater distance from the first end of the body member of the first ring member than the second flange of the first ring member.

16. The coupling assembly of claim 13, wherein the first flange of the second ring member is secured to the second pipe with grout.

17. The coupling assembly of claim 13, wherein the first flange of the second ring member extends a greater distance from the second end of the extended body member of the second ring member than the second flange of the second ring member.

18. The coupling assembly of claim 13, wherein a bottom portion of the second flange of the first ring member tapers away from the first end of the body member of the first ring member.

19. The coupling assembly of claim 13, wherein a bottom portion of the second flange of the second ring member tapers away from the second end of the extended body member of the second ring member.

20. A method of connecting two pipe segments, comprising the steps of:
providing a first pipe segment;
providing a second pipe segment;
inserting a first liner into the first pipe segment;
inserting a second liner into the second pipe segment;
providing a first ring member comprising a body member having a first end and a second end, the first end having a first flange and a second flange extending therefrom, the first flange and the second flange defining a space therebetween;
placing the first ring member in engagement with the first liner by securing an end of the first liner in the space formed between the first flange and the second flange of the first ring member;
providing a second ring member comprising an extended body member having a first end and a second end, the second end having a first flange and a second flange extending therefrom, the first flange and the second flange defining a space therebetween, and the extended body member being axially longer than the body member of the first ring member;
placing the second ring member in engagement with the second liner by securing an end of the second liner in the space formed between the first flange and the second flange of the second ring member;
interposing a corrosion barrier ring between the second end of the first ring member and the first end of the second ring member;
providing a coupling member adapted to receive a second end of the first pipe segment and a first end of the second pipe segment therein;
receiving a second end of the first pipe segment having the first liner disposed therein into the coupling member to fixedly join the first pipe segment with the coupling member; and
receiving a first end of the second pipe segment having the second liner disposed therein into the coupling member to fixedly join the second pipe segment with the coupling member.

21. A liner assembly for use in a joint between two pipe segments, comprising:
a two-part ring member comprising:
an outer sleeve having a generally cylindrical shape with a first end and a second end; and
an inner sleeve configured to be positioned within the outer sleeve, the inner sleeve comprising a body member having a first end and a second end, the first end having a flange extending therefrom, where the outer sleeve and the flange define an annular gap therebetween when the inner sleeve is positioned within the outer sleeve;
a second ring member comprising an extended body member having a first end and a second end, the second end having a first flange and a second flange extending therefrom, the first flange and the second flange defining a space therebetween;
a corrosion barrier ring disposed between and cooperating with the first end of the inner sleeve of the two-part ring member and the second end of the second ring member;
a first liner configured to be secured in the annular gap formed between the flange of the inner sleeve and outer sleeve; and
a second liner configured to be secured in the space formed between the first flange and the second flange of the second ring member.

22. The liner assembly of claim 21, wherein outer sleeve has a first end that extends a greater distance from the first end of the body member of the inner sleeve than the flange of the inner sleeve.

23. The liner assembly of claim 21, wherein the first flange of the second ring member is positioned adjacent and secured to a second pipe segment.

24. The liner assembly of claim 21, wherein the first flange of the second ring member extends a greater distance from the second end of the extended body member of the second ring member than the second flange of the second ring member.

25. The liner assembly of claim 21, wherein the corrosion barrier ring includes opposing indented ends comprised of beveled portions and the second end of the body member of the inner sleeve and the first end of the second ring member comprise registering beveled portions to cooperate with the opposing indented ends of the corrosion barrier ring.

* * * * *